United States Patent [19]

Kobayashi et al.

[11] 4,320,445
[45] Mar. 16, 1982

[54] GATE CONTROL CIRCUIT FOR THYRISTOR CONVERTER

[75] Inventors: Sumio Kobayashi, Yokohama; Tadashi Takahashi, Kawasaki; Hidetoshi Ino, Kunitachi; Takami Sakai, Akishima, all of Japan

[73] Assignee: Tokyo Shibaura Denki Kabushiki Kaisha, Kawasaki, Japan

[21] Appl. No.: 184,262

[22] Filed: Sep. 5, 1980

[30] Foreign Application Priority Data

Sep. 10, 1979 [JP] Japan .................................. 54-115159

[51] Int. Cl.³ ............................................ H02H 7/125
[52] U.S. Cl. ....................................... 363/54; 363/87; 363/68
[58] Field of Search .................................. 363/52–54, 363/68, 87, 129

[56] References Cited

U.S. PATENT DOCUMENTS 3,654,541 4/1972 Kelly, Jr. et al. ..................... 363/54
3,842,337 10/1974 Ekstrom et al. ...................... 363/53
4,084,206 4/1978 Leowald et al. .................. 363/54 X
4,084,221 4/1978 Ogata ..................................... 363/54
4,100,434 7/1978 Iyotani et al. ..................... 363/68 X

*Primary Examiner*—William M. Shoop
*Attorney, Agent, or Firm*—Oblon, Fisher, Spivak, McClelland & Maier

[57] ABSTRACT

In a gate control circuit for a thyristor converter, in which thyristor valves each having a plurality of series thyristors are connected to form a bridge, a detector for detecting a forward voltage applied across one of the thyristors and a circuit for supplying a gate signal to the gate of that thyristor valve are provided. The gate control circuit further comprises a circuit for supplying, when a bypass pair operation of the thyristor converter is switched over to a deblock operation, a signal to the gate of a continually conductive thyristor valve according to a control signal to a thyristor valve to be operated in deblock with the continually conductive thyristor valve and also a gate signal to the continually conductive thyristor valve.

6 Claims, 11 Drawing Figures

GATE CONTROL CIRCUIT FOR THYRISTOR CONVERTER

This invention relates to a thyristor converter and, more particularly, to a gate control circuit for a thyristor converter.

In DC power transmission systems, thyristor converters are generally used for converting AC into DC or vice versa. For a three-phase AC system, the thyristor converter is realized by a three-phase bridge circuit with individual arms thereof constituted by thyristor valves comprising a number of series- and parallel-connected thyristors. In each of the thyristor valves, a forward voltage across only several thyristors is detected, and the triggering of the thyristor valve is controlled such that a gate signal is coupled to the gates of all the thyristors in the valve according to an output signal from a phase control circuit only when the forward voltage is present in the valve. Where a DC power transmission system is started, an excessive voltage is applied to thyristor valves or a DC current flowing is interrupted on account of the vibration between a capacitance of a DC transmission line to the ground and a DC reactance. Accordingly, what is called bypass pair operation, in which two particular series arms (bypass pair arms) in the thyristor converter are rendered conductive, is caused at the time of the start. During the bypass pair operation, the thyristor converter is short-circuited. Subsequently, a deblock operation (or six-phase operation) in which the individual arms are consecutively triggered by setting aside one of the bypass pair arms. In each thyristor valve, a snubber capacitor is connected in parallel with thyristors, so that at the time when the bypass pair operation is switched over to the deblock operation the snubber capacitors are discharged to cause current to flow through the bypass pair arms in the opposite direction. Thus, the current in the thyristor to be kept conductive at the time of switching from the bypass pair operation over to the deblock operation is cut off to produce an inverse voltage. If the period of presence of the inverse voltage is short, all thyristors in the thyristor valve are not rendered nonconductive but held conductive as soon as a forward voltage is applied across them, so that the thyristor converter can normally proceed to the deblock operation.

However, the inverse voltage that is applied across the thyristors in the thyristor valve vary with the individual thyristors depending upon the magnitude of the current before the cut-off or the differential value of that current or due to fluctuations of the characteristics of the thyristors. Thus, at this time some of the thyristors in the thyristor valve are cut off while the rest are held conductive. The forward voltage of the thyristor valve is detected by detecting not the voltage across all the thyristors in the valve but only the voltage across several thyristors, on account of economy and easiness of manufacturing and the detected voltage is regarded as what is applied across all the thyristors. Therefore, if the thyristors, the voltage across which is detected, are conductive and no forward voltage is applied, even if the phase control circuit produces the output signal, no gate signal is supplied to the thyristor valve so that the valve is not triggered. When a forward voltage is applied to the valve, it is shared by only thyristors in the nonconductive state. Therefore, if the nonconductive thyristors are small in number, it is likely that a voltage in excess of the forward block voltage of the thyristor is applied to cause rapture thereof.

An object of the invention is to provide a gate control circuit for a thyristor converter, with which it is possible to prevent the application of a forward voltage in excess of the forward block voltage across the nonconductive thyristors in the valve which is to be continually held conductive at the time of the switching of the bypass pair operation over to the deblock operation to prevent rapture thereof.

The above object of the invention is realized by a gate control circuit for a thyristor converter which includes bridge means including arms individually constituted by respective thyristor valves each having a plurality of thyristors connected in series and phase control means for producing a signal commanding the conduction of the individual thyristor valves in the bridge means and is operated in a bypass pair operation mode at the time of the start before being switched over to a deblock operation mode comprising detecting means connected across the anode-to-cathode path of at least one of the thyristors in one of the thyristor valves in the bridge means for producing a detection signal corresponding to the anode-to-cathode voltage across the one of the thyristors, first means connected to the phase control means and detecting means for producing a first gate signal according to the detection signal and a first signal commanding the conduction of the thyristor valve connected to the detecting means, and second means connected to the phase control means for producing a second gate signal according to the first signal and a second signal commanding the conduction of the thyristor valve to be operated for deblocking with the thyristor valve connected to the detecting means.

This invention can be more fully understood from the following detailed description when taken in conjunction with the accompanying drawings, in which.

Figure 1:
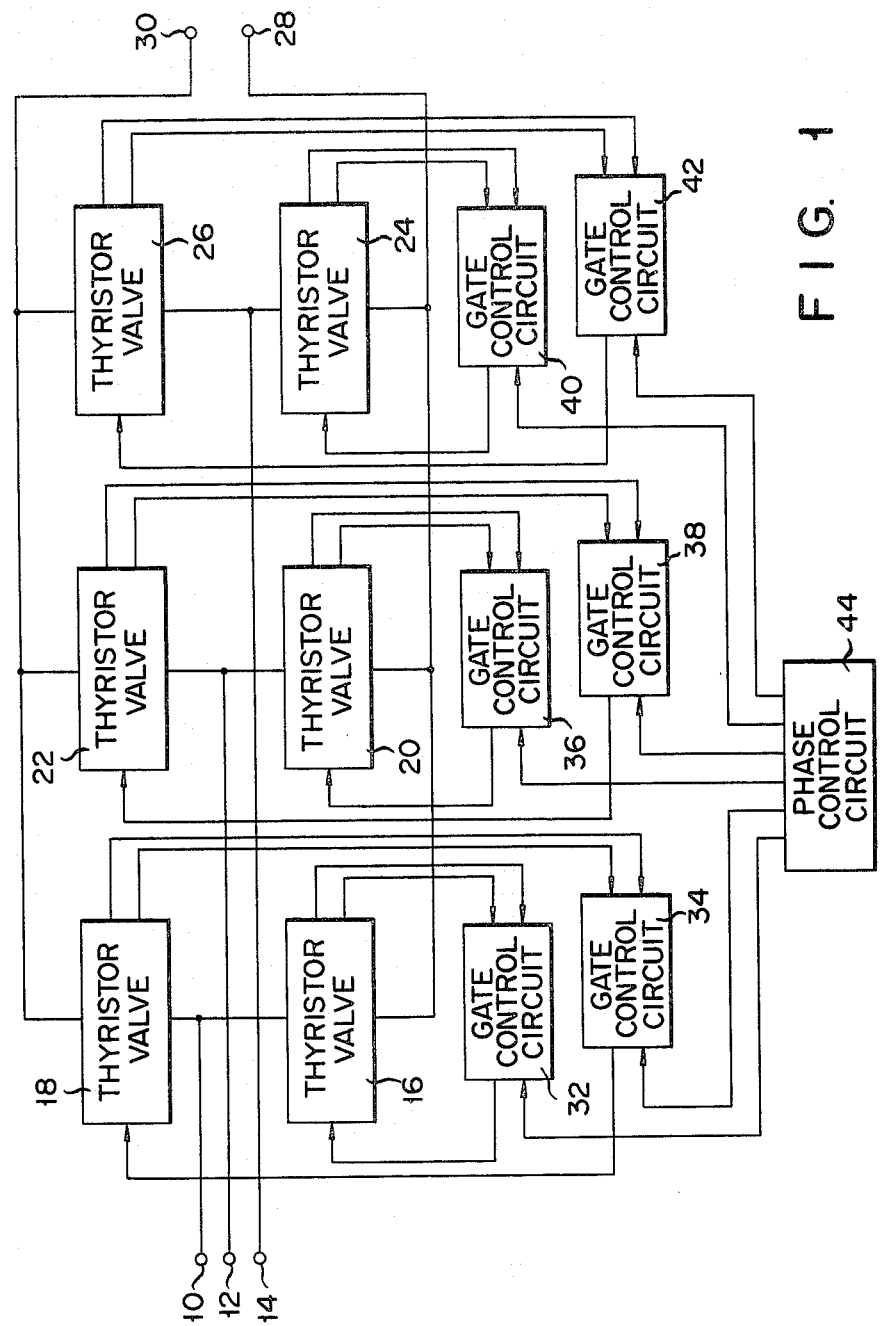
FIG. 1 is a block diagram showing a thyristor converter.

Now, an embodiment of the gate control circuit for a thyristor converter according to the invention will be described with reference to the accompanying drawings. FIG. 1 is a block diagram showing the whole construction of a thyristor converter for converting three-phase AC into DC. Input terminals 10, 12 and 14 are connected to three-phase buses, respectively. The input terminal 10 is connected to one terminal of U- and X-phase thyristor valves 16 and 18, the input terminal 12 is connected to one terminal of V- and Y-phase thyristor valves 20 and 22, and the input terminal 14 is connected to one terminal of W- and Z-phase thyristor valves 24 and 26. The thyristor valves 16, 18, 20, 22, 24 and 26 each comprise a plurality of thyristors connected in series. A series circuit consisting of a snubber resistor and snubber capacitor is connected in parallel to each of these thyristors. The other terminals of the U-, V- and W-phase thyristor valves 16, 20 and 24 are connected to an output terminal 28, and the other terminals of the X-, Y- and Z-phase thyristor valves 18, 22 and 26 are connected to an output terminal 30. The output terminals 28 and 30 are connected, for instance, to DC transmission lines (not shown). In each of the thyristor valves 16, 18, 20, 22, 24 and 26, the opposite ends of a portion (in this embodiment a current path constituted by two adjacent series thyristors) are connected to each of gate control circuits 32, 34, 36, 38, 40 and 42. A phase control circuit 44 for producing on-off signals determining the conduction period of each of the thyristor valves is connected to the individual gate control circuits 32, 34, 36, 38, 40 and 42. The gate control circuits 32, 34, 36, 38, 40 and 42 have their output terminals individually connected to the gate terminals of all the thyristors in the respective thyristor valves 16, 18, 20, 22, 24 and 26.

Figure 2:
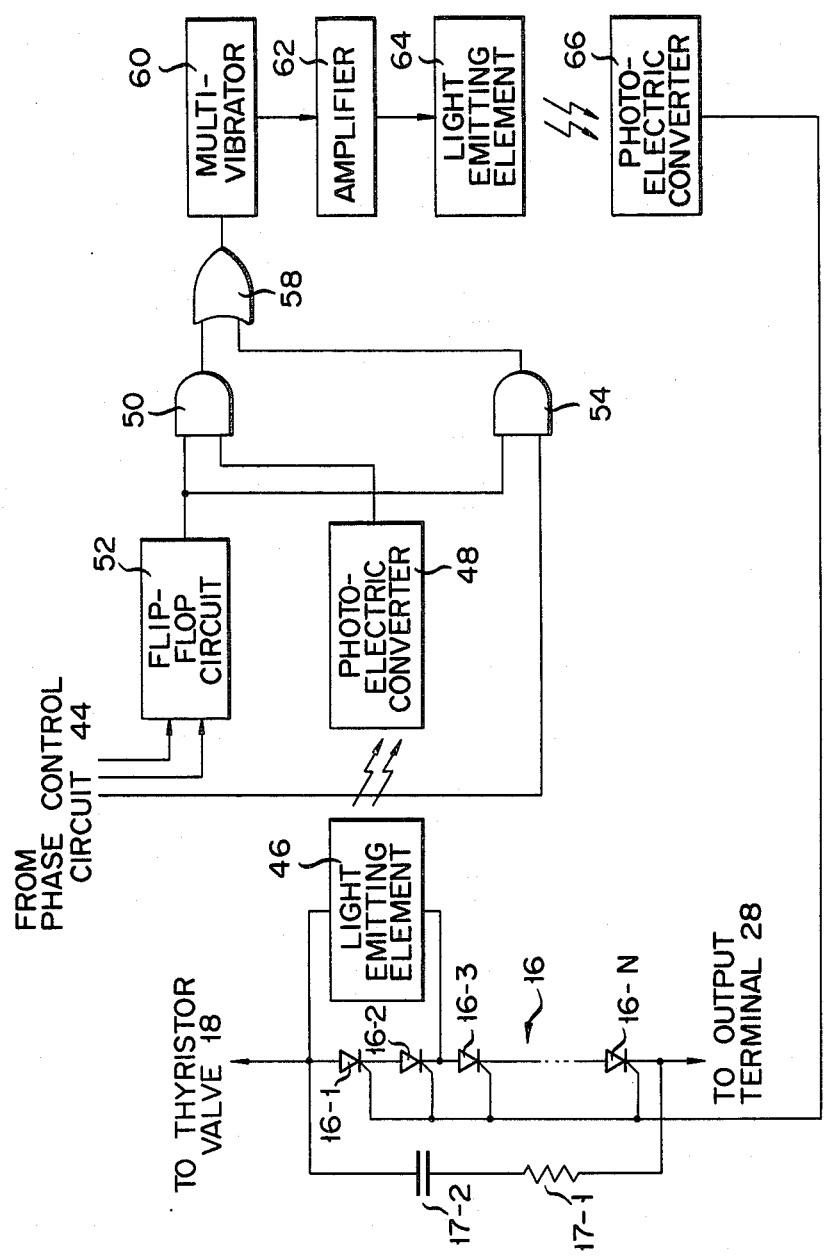
FIG. 2 is a block diagram showing an embodiment of the gate control circuit for a thyristor converter according to the invention.

The construction of these gate control circuits will now be described. Since these gate control circuits have the same construction, only the construction of the gate control circuit 32 which controls the conduction of the U-phase thyristor valve 16 will be described with reference to FIG. 2, and the description of the other gate control circuits is omitted. The thyristor valve 16 comprises N series thyristors 16-1, 16-2, ..., 16-N, a snubber resistor 17-1 and a snubber capacitor 17-2. A light-emitting element such as an LED is connected between the anode of the first thyristor 16-1 and the cathode of the second thyristor 16-2. The illustrated location of connection of the light-emitting element 46 is not limitative. Light from the light-emitting element 46 is coupled through a light guide such as an optical-fiber cable (not shown) to a photoelectric converter 48 such as a PTR. The photoelectric converter 48 has its output terminal connected to one input terminal of an AND gate 50.

Meanwhile, a U-phase "on" signal and a U-phase "off" signal for causing the conduction and nonconduction of the U-phase thyristor valve 16 respectively, are supplied from the phase control circuit 44 to respective set and reset terminals of a flip-flop circuit 52. The flip-flop circuit 52 has its Q output terminal connected to an other input terminal of the AND gate 50 and also to one input terminal of an AND gate 54. The conduction period of each thyristor valve, that is when the high output signal is produced from the Q output terminal of the flip-flop circuit 52, is an electrical angle of 120°. In the deblock period, individual thyristor valves are triggered in the order of U-, Z-, V-, X-, W- and Y-phases with a delaying angle of 60° provided between two consecutive phases. A Y-phase "on" signal for causing the conduction of the Y-phase thyristor valve 22, which deblocks with the U-phase thyristor valve 16 controlled by the gate control circuit 32, is supplied from the phase control circuit 44 to an other input terminal of the AND gate 54 in the gate control circuit 32. The AND gates 50 and 54 have their output terminals connected to respective input terminals of an OR gate 58, which has its output terminal connected to a monostable multivibrator 60. The output signal of the monostable multivibrator 60 is coupled through an amplifier 62 to a light-emitting element 64 which may be an LED or the like. Light from the light-emitting element 64 is coupled through a light guide (not shown) to a photoelectric converter 66 such as a PTR. The photoelectric converter 66 has its output terminal connected to the gates of the thyristors 16-1, 16-2, ..., 16-N in the U-phase thyristor valve 16.

Now, the operation of this embodiment will be described with reference to FIG. 3. FIG. 3 is a time chart showing waveforms appearing at various parts of the circuit of FIG. 2. The operation of this thyristor converter will be described in connection with a case in which a bypass pair operation, in which only the U-phase and X-phase thyristor valves are rendered conductive, is caused at the time of the start, and subsequently the Y-phase thyristor valve 22 is triggered to cause transfer of current from the X-phase valve 18 to the Y-phase valve 22 and thus let the Y-phase valve 22 deblock with the U-phase valve 16. The individual phase valves are triggered in the order of the U-, Z-, V-, X-, W-, Y- and then again U-phase as mentioned earlier. This means that in the bypass pair arm the U-phase valve 16 is held continually conductive at the time when the bypass pair operation is switched over to the deblock operation.

Figure 3A:
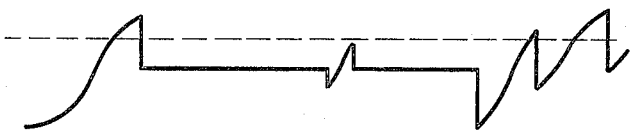
FIGS. 3A to 3I form a time chart showing waveforms appearing at various parts of the circuit of FIG. 2.
Figure 3B:
Figure 3C:
Figure 3D:
Figure 3E:
Figure 3F:
Figure 3G:
Figure 3H:

When the three-phase AC voltage inputs are supplied to the input terminals 10, 12 and 14, a voltage as shown by solid line in FIG. 3A is coupled across the first and second thyristors 16-1 and 16-2 in the U-phase valve 16. As a result, a bypass pair current flows through the output terminal 30, X-phase thyristor valve 18, U-phase thyristor valve 16 and the output terminal 28. The light-emitting element 46 emits light when the forward voltage applied across the thyristors 16-1 and 16-2 is above a forward voltage detection level as shown by dashed line in FIG. 3A, and the photoelectric converter 48 produces a corresponding output signal as shown in FIG. 3B, the signal being brought to an H level when the forward voltage detection level is exceeded. During the period, during which the forward voltage is applied to the U-phase valve 16, a U-phase "on" signal, which is a pulse signal as shown in FIG. 3C, for causing the conduction of the U-phase valve 16 is supplied from the phase control circuit 44 to the set terminal of the flip-flop circuit 52 in the gate control circuit 32 for the U-phase valve 16, whereupon the Q output signal of the flip-flop circuit 52 is brought to an H level as shown in FIG. 3D. This state is continued until a U-phase "off" signal shown in FIG. 3E is supplied from the phase control circuit 44 to the reset terminal of the flip-flop circuit 52. With the inversion of the flip-flop Q output signal to the H level the output signal of the AND gate 50 is brought to an H level as shown in FIG. 3F. The monostable multivibrator 60 produces an H level output signal for a predetermined period of time from the rising of the output signal of the AND gate 50, as shown in FIG. 3G. With the output signal of the multivibrator 60 the light-emitting element 64 is caused to emit light, which is converted by the photoelectric converter 66 into an electric signal which is coupled to the gates of all the thyristors 16-1, 16-2, ..., 16-N in the U-phase valve 16, whereby the U-phase valve is triggered. When the U-phase valve 16 is triggered, the voltage applied across the thyristors 16-1 and 16-2 are brought to zero level as shown in FIG. 3A, and also the output signal of the photoelectric converter 48 is inverted to an L level as shown in FIG. 3B.

Meanwhile, an X-phase valve 18 "on" signal is supplied from the phase control circuit 44 to the gate control circuit 34 for the X-phase valve 18 to trigger this valve in a similar manner, whereby the bypass pair operation of the thyristor converter is caused.

At the time of the switching from the bypass pair operation over to the deblock operation, with the triggering of the Y-phase valve 22 the snubber capacitors in the V-phase valve 20 are discharged through the U-, X- and Y-phase valves 16, 18 and 22 in the mentioned order. The discharge current flows through the U- and X-phase valves 16 and 18 in the opposite direction, so that the bypass pair current flowed during the bypass pair operation is interrupted to flow and some of the thyristors in these valves are cut off. If the thyristors 16-1 and 16-2 in the U-phase valve 16 connected to the gate control circuit 32 keep conductive, the light-emitting element 46 can detect no forward voltage. In this case, the output signal of the AND gate 50 is not inverted to the H level. Thus, the U-phase valve 16 is not rendered conductive, so that the switching from the bypass pair operation over to the deblock operation cannot be obtained.

Figure 3I:

According to the invention, the Y-phase "on" signal for triggering the Y-phase valve 22 for the deblock operation is also coupled to the AND gate 54 within the gate control circuit 32, so that the output signal from the AND gate 54 is rendered to an H level as shown in FIG. 3I. Thus, the output signal of the monostable multivibrator 60 is rendered to be at the H level for a predetermined period of time as shown in FIG. 3G independently of the output signal of the AND gate 50. In this way, the U-phase valve 16 is continually held conductive, so that the deblock operation is started with the conduction of both the U- and Y-phase valves 16 and 22. Since the U-phase valve 16 is rendered conductive with the Y-phase "on" signal, even if some of the thyristors 16-1, 16-2, ..., 16-N in the U-phase valve 16 are cut off at the time when the bypass pair operation with the U- and X-phase valves 16 and 18 is switched over to the deblock operation with the U- and Y-phase valves 16 and 22, they are soon triggered again.

While in the above embodiment light is used for triggering the thyristor valve in order to provide for electric insulation of the thyristor valve and gate control circuit from each other, it is also possible to use a pulse transformer or the like.

What we claim is:

1. A gate control circuit for a thyristor converter which includes bridge means including arms individually constituted by respective thyristor valves each having a plurality of thyristors connected in series and phase control means for producing a signal commanding the conduction of the individual thyristor valves in the bridge means and said converter is operated in a bypass pair operation mode at the time of the start before being switched over to a deblock operation mode comprising:
    detecting means connected across the anode-to-cathode path of at least one of the thyristors in one of the thyristor valves in said bridge means for producing a detection signal corresponding to the anode-to-cathode voltage across said one of the thyristors;
    first means connected to said phase control means and detecting means for producing a first gate signal according to the detection signal and a first signal commanding the conduction of the thyristor valve connected to said detecting means; and
    second means connected to said phase control means for producing a second gate signal according to the first gate signal and a second signal commanding the conduction of the thyristor valve to be operated for deblocking with the thyristor valve connected to said detecting means.

2. A gate control circuit according to claim 1, wherein said detecting means includes a light-emitting element for emitting light when the thyristor forward voltage exceeds a predetermined value, and a photoelectric converter for receiving light from said light-emitting element and producing an output signal according to the received light.

3. A gate control circuit according to claim 1, which further comprises third means including a light-emitting element connected to the first and second means for emitting light according to either one of said first and second gate signals, and a photoelectric converter connected to the gates of all the thyristors in the thyristor valve connected to said detecting means for receiving light from said light-emitting element and for supplying a signal to the gates according to the received light.

4. A thyristor converter operated in a bypass pair mode at the time of the start being switched over to a deblock operation mode comprising:
    bridge means including arms individually constituted by respective thyristor valves each having a plurality of thyristors connected in series;
    phase control means for producing a signal commanding the conduction of the individual thyristor valves in said bridge means according to the phase of an AC signal supplied to said bridge means;
    detecting means connected across the anode-to-cathode path of at least one of the thyristors in one of the thyristor valves in said bridge means for producing a detection signal corresponding to the anode-to-cathode voltage across said one of the thyristors;
    first means connected to said phase control means and detecting means for producing a first gate signal according to the detection signal and a first signal commanding the conduction of the thyristor valve connected to said detecting means; and
    second means connected to said phase control means for producing a second gate signal according to the first gate signal and a second signal commanding the conduction of the thyristor valve to be operated for deblocking with the thyristor valve connected to said detecting means.

5. A thyristor converter according to claim 4, wherein said detecting means includes a light-emitting element for emitting light when the thyristor forward voltage exceeds a predetermined value, and a photoelectric converter for receiving light from said light-emitting element and producing an output signal according to said received light.

6. A thyristor converter according to claim 4, which further comprises third means including a light-emitting element connected to said first and second means for emitting light according to either one of the first and second gate signals, and a photoelectric converter connected to the gates of all the thyristors in the thyristor valve connected to said detecting means for receiving light from said light-emitting element and for supplying a signal to the gates according to the received light.

* * * * *